United States Patent
Arndt Dr habil et al.

(10) Patent No.: US 12,370,879 B2
(45) Date of Patent: Jul. 29, 2025

(54) ENGINE MOUNT FOR HYBRID ELECTRIC VEHICLE

(71) Applicant: Ford Global Technologies, LLC, Dearborn, MI (US)

(72) Inventors: Christoph Arndt Dr habil, Moerlen (DE); Johannes Wiessalla, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 18/063,406

(22) Filed: Dec. 8, 2022

(65) Prior Publication Data

US 2023/0191889 A1  Jun. 22, 2023

(30) Foreign Application Priority Data

Dec. 20, 2021  (DE) ......................... 102021133792.5

(51) Int. Cl.
| | |
|---|---|
| *B60K 5/12* | (2006.01) |
| *A61G 5/04* | (2013.01) |
| *B60K 1/00* | (2006.01) |
| *B60K 7/00* | (2006.01) |
| *B60W 10/08* | (2006.01) |

(52) U.S. Cl.
CPC .............. *B60K 5/1283* (2013.01); *A61G 5/04* (2013.01); *B60K 1/00* (2013.01); *B60K 7/0007* (2013.01); *B60W 10/08* (2013.01); *B60Y 2200/92* (2013.01); *Y02T 90/14* (2013.01)

(58) Field of Classification Search
CPC ...... B60K 5/1283; B60K 1/00; B60K 7/0007; A61G 5/04; B60W 10/08; B60Y 2200/92; Y02T 90/14
See application file for complete search history.

(56) References Cited

U.S. PATENT DOCUMENTS

| | | | |
|---|---|---|---|
| 5,386,977 A | 2/1995 | Quast | |
| 7,194,344 B2 * | 3/2007 | Gee ........................ | B60K 6/445 |
| | | | 180/312 |
| 10,001,191 B2 * | 6/2018 | Mathai .................. | F16F 13/002 |
| 10,180,173 B2 * | 1/2019 | Kim ....................... | F16F 13/10 |
| 10,220,695 B2 * | 3/2019 | Hill ......................... | B60K 5/10 |
| 10,400,691 B2 * | 9/2019 | Serrano ................. | F02D 41/107 |
| 10,493,836 B2 * | 12/2019 | Serrano ................. | F16F 15/121 |
| 10,549,621 B2 * | 2/2020 | Yun ....................... | F16F 13/106 |
| 10,753,422 B2 * | 8/2020 | Raida ..................... | F16F 13/26 |
| 10,997,805 B2 * | 5/2021 | Dudar ................... | B60W 10/184 |
| 11,215,260 B2 * | 1/2022 | Ito ......................... | F16F 9/3485 |
| 11,230,178 B2 * | 1/2022 | Kim ....................... | B60K 5/1283 |
| 11,560,840 B2 * | 1/2023 | Schelfaut ............... | F02C 7/00 |
| 2007/0192008 A1 * | 8/2007 | Pognant-Gros ....... | B60W 30/20 |
| | | | 701/51 |

(Continued)

FOREIGN PATENT DOCUMENTS

DE        102005016606 A1    10/2006

*Primary Examiner* — Erez Gurari
(74) *Attorney, Agent, or Firm* — Vincent Mastrogiacomo; McCoy Russell LLP

(57) ABSTRACT

Methods and systems are provided for an engine. In one example, a method includes adjusting a stiffness of an engine suspension unit in response to outputs from the engine and the electric motor. The stiffness increases as an engine power output decreases.

19 Claims, 2 Drawing Sheets

(56) References Cited

U.S. PATENT DOCUMENTS

| | | | | |
|---|---|---|---|---|
| 2010/0096789 A1* | 4/2010 | Gannon | ............... | F16F 13/262 |
| | | | | 267/140.15 |
| 2014/0217661 A1* | 8/2014 | Schumann | ............ | F16F 13/264 |
| | | | | 267/140.14 |
| 2016/0108988 A1* | 4/2016 | Kim | .................... | B60K 5/1208 |
| | | | | 267/140.11 |
| 2018/0086196 A1* | 3/2018 | Tooyama | ............. | B60K 5/1283 |
| 2020/0269672 A1* | 8/2020 | Ito | ........................ | B60K 5/1241 |
| 2022/0389987 A1* | 12/2022 | Rumeau | ................... | B60K 1/00 |
| 2023/0191889 A1* | 6/2023 | Arndt Dr habil | ........ | B60K 1/00 |
| | | | | 248/638 |
| 2024/0359679 A1* | 10/2024 | Pilz | ...................... | B60W 10/08 |

* cited by examiner

ENGINE MOUNT FOR HYBRID ELECTRIC VEHICLE

CROSS REFERENCE TO RELATED APPLICATION

The present application claims priority to German Patent Application No. 102021133792.5 filed on Dec. 20, 2021. The entire contents of the above-listed application is hereby incorporated by reference for all purposes.

FIELD

The present description relates generally to a motor vehicle with a full hybrid electric drive, which has at least one internal combustion engine, which is connected via at least one engine suspension unit to at least one component of a sprung mass of the motor vehicle, at least one electric motor and at least one control electronics system, which is set up to drive the motor vehicle in an electric driving mode of the full hybrid electric drive exclusively with the electric motor when the internal combustion engine is switched off.

BACKGROUND/SUMMARY

A full hybrid electric motor vehicle is equipped with an electric motor and an internal combustion engine. When only the electric motor drives the motor vehicle, the internal combustion engine is switched off and is thus only an additional mass carried by the motor vehicle. This additional mass is not fixed to the rest of the motor vehicle, since the internal combustion engine is usually attached to the rest of the motor vehicle via an engine suspension comprising dampers and the like.

An engine suspension may be adjusted to minimize the transmission of vibrations from the working internal combustion engine to the vehicle body. In particular, such an engine suspension is therefore not a rigid connection between the internal combustion engine and the vehicle body, but a system with a damping effect tailored to the motor vehicle.

The internal combustion engine, which is "loosely" or movably connected to the vehicle body via the engine suspension, therefore represents a mass that can trigger a separate vibration process. These separate vibrations or oscillations may reduce customer satisfaction, for example, if the internal combustion engine is stimulated to vibrate during a journey by certain driving conditions, for example when driving on an uneven road, or when driving over potholes and the like.

DE 10 2005 016 606 A1 and U.S. Pat. No. 5,386,977A each disclose a hydraulically damping engine mount.

U.S. Pat. No. 7,194,344B2 discloses a suspension assembly for connecting a vehicle drivetrain assembly to a vehicle chassis. The suspension assembly comprises at least one switchable suspension operable at least in an engine idle mode, at least one vehicle sensor operatively connected to the drivetrain, and a controller for receiving and processing the input from said at least one vehicle sensor and for controlling the switchable suspension such that it switches to the engine idle mode when the processed input from said at least one vehicle sensor exceeds a preselected threshold.

U.S. Pat. No. 10,400,691B2 discloses a system and a method for reducing noise or vibration generated by an internal combustion engine of a vehicle, wherein a noise, vibration, and harshness (NVH) characteristic of the vehicle is changed based at least in part on a characteristic of a modulation operation of a cylinder output of the internal combustion engine.

The object of the present disclosure is to improve the NVH behavior of a motor vehicle with a full hybrid electric drive. In one example, the issues described above may be at least partially solved by a method for adjusting a stiffness of an engine suspension unit in response to a power output of an engine. By doing this, the stiffness of the engine suspension unit may be tailored to mask vibrations of the engine generated due to combustion or to road conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
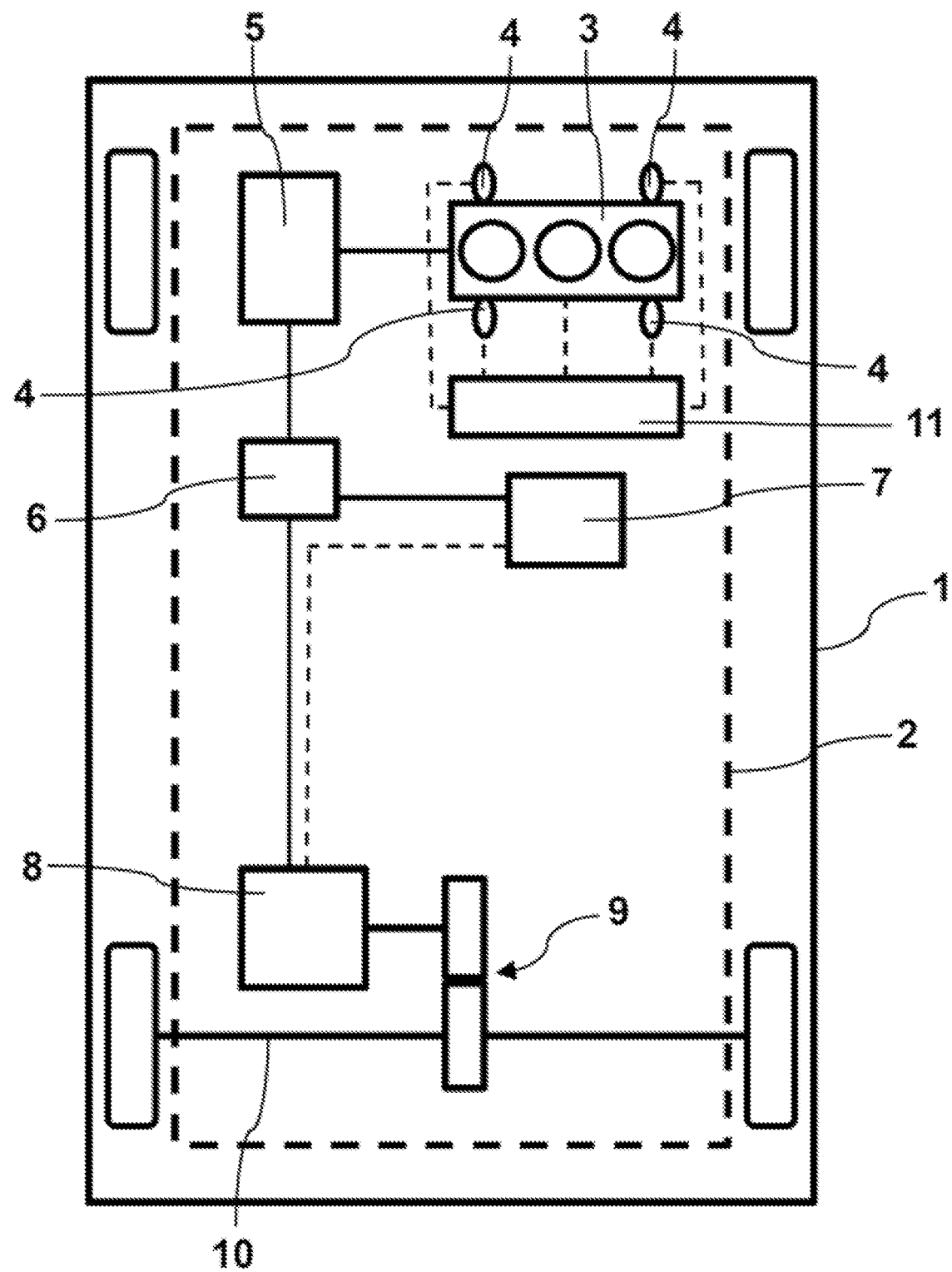
FIG. 1 illustrates a schematic of a hybrid vehicle according to an embodiment of the present disclosure.
Figure 2:
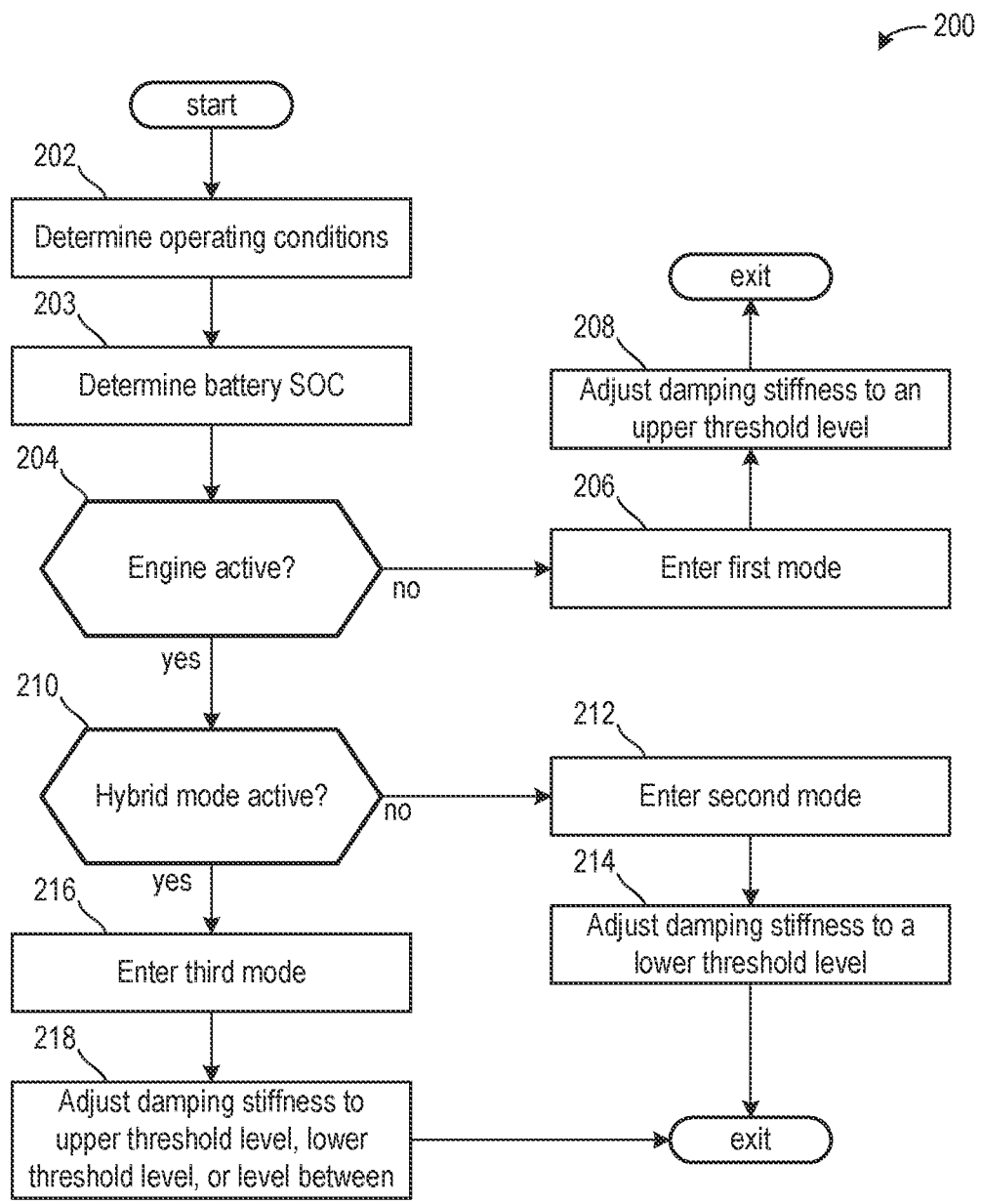
FIG. 2 illustrates a method for adjusting a suspension unit of an engine of the hybrid vehicle based on conditions.

The following description relates to systems and methods for an engine. FIG. 1 illustrates a schematic of a hybrid vehicle according to an embodiment of the present disclosure comprising the engine and an electric motor. FIG. 2 illustrates a method for adjusting a fixing unit of an engine of the hybrid vehicle based on conditions.

The disclosure provides support for a motor vehicle having at least one fixing unit which is connected or can be connected to the control electronics system and is arranged in the region of the engine suspension unit or is formed by the engine suspension unit, the activation of the fixing unit(s) via the control electronics system causing the internal combustion engine to be rigidly connectable or connected to the component, the control electronics system being set up to activate the fixing unit at least temporarily during the electric driving mode. In one example, the fixing unit is adjusted by consuming a charge of a battery of the vehicle, wherein as the stiffness of the fixing unit increases, the charge consumed also increases.

It should be noted that the features as well as measures listed individually in the following description can be combined with each other in any technically feasible manner and show further embodiments of the disclosure. The description additionally characterizes and specifies the disclosure, in particular in conjunction with the figure.

According to the disclosure, the internal combustion engine can be at least temporarily rigidly connected to the component of the sprung mass of the motor vehicle during the electric driving mode. In this way, movements of the switched-off internal combustion engine relative to the component can be mitigated, which in turn reduces vibrations generated by these movements from being transmitted to the component and generating unwanted noise and thus impairing ride comfort. By contrast, a switched-off internal combustion engine that is mounted as described above with respect to previous examples would move in the electric driving mode when driving over unevenness, such as holes, longitudinal grooves and transverse grooves, and/or as a result of the particular driving style, for example due to strong acceleration, strong braking, fast cornering and the like, due to its mass inertia relative to the sprung mass and thus would transmit vibrations to the component of the sprung mass separate from road/driving conditions resulting in the vibrations. In one example, the fixing unit of the present disclosure may sync vibrations of the sprung mass and the engine when the engine is deactivated such that vibrations generated are due to driving style, road conditions, accelerations, and the like and not further due to the engine moving separately from the sprung mass.

The fixing unit may be a structural unit arranged separately from the engine suspension unit or may be formed by at least a portion of the engine suspension unit. The fixing unit or the engine suspension unit, if this forms the fixing unit, can be connected or connectable to the control electronics system by cable or wirelessly in order to be activatable and deactivatable in accordance with the disclosure via the control electronics system. The fixing unit may include an actuator configured to receive signals from the control system to adjust a stiffness of the fixing unit. In one example, in the absence of a signal, the fixing unit may include where a stiffness thereof is equal to a minimum level.

The control electronics system may be set up to control the operation of the full hybrid electric drive by open-loop and/or closed-loop control. The control electronics system can be set up to activate the fixing unit or the engine suspension unit, if this forms the fixing unit, when the internal combustion engine is switched off, i.e. in particular at the same time as the internal combustion engine is switched off. For this purpose, the control electronics system can be set up to switch off and start the internal combustion engine and/or activate and deactivate the electric motor.

The engine may be a diesel engine, a gasoline engine, a multi-fuel engine, or an electric engine. The internal combustion engine can also be connected to one or more components of a sprung mass of the motor vehicle via two or more engine suspension units, wherein each engine suspension unit can be associated with its own fixing unit or each engine suspension unit can form its own fixing unit. The component can, for example, be a longitudinal member or a body component.

For example, the full hybrid electric drive may be a series full hybrid electric drive, a parallel full hybrid electric drive, or a mixed hybrid electric drive.

The motor vehicle may, for example, be a passenger car or a commercial motor vehicle.

According to an embodiment, the engine suspension unit, which forms the fixing unit, has an adjustable damping stiffness, with the control electronics system being set up to control the engine suspension unit in such a way that the engine suspension unit has a maximum damping stiffness during the electric driving mode and a damping stiffness which is reduced compared with the maximum damping stiffness outside the electric driving mode. According to this embodiment, no separate fixing unit is provided. Instead, the fixing unit is formed entirely by the engine suspension unit, and the fixing unit may also be identical to the engine suspension unit. The engine suspension unit can be formed in such a way that its damping stiffness can be varied continuously or in discrete steps via the control via the control electronics system. The engine suspension unit can be controlled here by the control electronics system in such a way that the engine suspension unit can be used to rigidly couple the internal combustion engine to the component of the sprung mass at maximum damping stiffness and a lower damping stiffness can be maintained constant or varied or adjusted in an operation of the full hybrid electric motor in which the motor vehicle is driven either by the internal combustion engine and the electric motor together or exclusively by the internal combustion engine. In one example, the stiffness selected for the fixing unit may be inversely proportional to one or more of a power output, an engine load, and an engine speed of the engine. For example, the stiffness may increase in response to the power output of the engine decreasing. By tailoring the stiffness of the fixing unit in this way, vibrations due to combustion and non-combustion conditions (e.g., driving over unevenness, such as holes, longitudinal grooves and transverse grooves, and/or as a result of the particular driving style, for example due to strong acceleration, strong braking, fast cornering and the like) may be muted, and NVH may be reduced.

According to a further embodiment, the control electronics system is set up to deactivate the fixing unit in the electric driving mode before the internal combustion engine is started. This may prevent the internal combustion engine from transmitting typical starting movements to the sprung mass of the motor vehicle in a disruptive manner during the starting process. These starting movements can be absorbed by the engine suspension unit, since the fixing unit or the engine suspension unit, if this forms the fixing unit, has been deactivated before the internal combustion engine is started.

Additionally or alternatively, a method may include where the internal combustion engine is at least temporarily rigidly connected to a component of a sprung mass of the motor vehicle during the electric driving mode.

The advantages mentioned above with reference to the motor vehicle are correspondingly associated with the method. In particular, the motor vehicle can be used according to one of the above-mentioned embodiments or a combination of at least two of these embodiments with each other for carrying out the method.

According to an additional embodiment, the internal combustion engine is at least temporarily rigidly connected to the component during the electric driving mode via at least one fixing unit, the fixing unit being arranged in the region of an engine suspension unit via which the internal combustion engine is connected to the component or being formed by the engine suspension unit.

According to a further embodiment, the engine suspension unit forming the fixing unit and having an adjustable damping stiffness is controlled in such a way that the engine suspension unit has a maximum damping stiffness during the electric driving mode and a damping stiffness which is reduced compared with the maximum damping stiffness outside the electric driving mode.

Additionally or alternatively, the fixing unit is deactivated in the electric driving mode before the internal combustion engine is started.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a schematic representation of an exemplary embodiment for a motor vehicle 1 according to the disclosure with a full hybrid electric drive 2 in the form of a series full hybrid electric drive. Alternatively, the full hybrid electric drive may be configured as a parallel full hybrid electric drive or as a mixed hybrid electric drive.

The full hybrid electric drive 2 comprises an internal combustion engine 3 that is connected to a sprung mass of the motor vehicle 1 via engine suspension units 4.

Furthermore, the full hybrid electric drive 2 has a generator 5 drivable by the internal combustion engine 3, an inverter 6 connected to the generator 5, a battery 7 connected to the inverter 6, and an electric motor 8 connected to the inverter 6. The electric motor 8 is connected to a drive axle 10 of the motor vehicle 1 via a transmission 9.

In addition, the full hybrid electric drive 2 has a control electronics system 11 which is set up to drive the motor vehicle 1 exclusively with the electric motor 8 in an electric driving mode of the full hybrid electric drive 2 when the internal combustion engine 3 is switched off.

In addition, the full hybrid electric drive 2 has four fixing units connected or connectable to the control electronics system 11 and formed by respective engine suspension units 4, the activation of the fixing units by the control electronics system 11 causing the internal combustion engine 3 to be rigidly connected to the sprung mass of the motor vehicle 1. The control electronics system 11 is set up to activate each fixing unit or its corresponding engine suspension unit 4 at least temporarily during the electric driving mode.

Each engine suspension unit 4, which forms a corresponding fixing unit, has an adjustable damping stiffness. The control electronics system 11 is set up to control the engine suspension units 4 in such a way that each engine suspension unit 4 has a maximum damping stiffness during the electric driving mode and a damping stiffness which is reduced compared to the maximum damping stiffness outside the electric driving mode.

Furthermore, the control electronics system 11 is set up to deactivate a fixing unit or its corresponding engine suspension unit 4 in the electric driving mode before the internal combustion engine 3 is started.

Turning now to FIG. 2, it shows a method 200 for adjusting damping stiffness of one or more engine fixing units in response to conditions. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 200 begins at 202, which includes determining operating conditions. Operating conditions may include one or more of an engine power output, a battery power output, a generator operation, a road grade, a road type, and road conditions. The road type may include one of pavement, gravel, dirt, concrete, or other types of terrain.

At 203, the method 200 may include determining a battery state-of-charge (SOC). The battery SOC may be determined via a multimeter, tracked over time, or other method/device. The battery SOC may be equal to 100%, 0%, or a percentage therebetween. 100% may correspond to a full charge of the battery and 0% may correspond to a full discharge. The battery SOC may be used to determine an amount of adjustment useable for the engine fixing unit. For example, as a driving demand changes and consumption of the battery SOC changes, an amount of engine fixing unit adjustment may also change. A determination of the engine fixing unit may be based on a combination of the driving mode and the battery SOC. The determination may be modified based on the battery SOC, a remaining distance of a travel path, a current powertrain operating mode, anticipated powertrain operating modes, and the like. For example, if the battery SOC is sufficient to travel a distance equal to the remaining distance of the travel path, then the engine fixing unit may not be adjusted in an all-electric driving mode to preserve the battery SOC. In some examples, an alert or other notification may be sent to a vehicle operator regarding a possibility of increased NVH due to insufficient battery SOC to complete the travel path and stiffen the engine fixing unit.

At 204, the method 200 may include determining if the engine is active. The engine may be active if the engine is actively being fueled and combusting. Additionally or alternatively, a direction of engine power output may be determined to determine an engine activity. As an example, the direction of engine power may be toward the vehicle wheels and/or toward the generator.

If the engine is inactive, then at 206, the method 200 may include entering a first mode for operating the engine fixing unit. In one example, the first mode may be selected during an all-electric vehicle operation, which may include increasing the engine fixing unit stiffness.

At 208, the method 200 may include adjusting the damping stiffness of the engine fixing unit to an upper threshold level. In one example, the upper threshold level is based on a highest or a maximum amount of stiffness of the engine fixing unit. Additionally or alternatively, the upper threshold level may be further based on the battery SOC. For example, if the battery SOC is greater than a threshold SOC based on a remaining distance for a travel path and power used to maintain the highest stiffness for the remaining distance, then the upper threshold level may be equal to the highest amount of stiffness. In another example, if the battery SOC is less than the threshold SOC, then the upper threshold level may be adjusted to a highest stiffness maintainable via the current battery SOC for a remainder of the travel path. If the battery SOC is less than a lower threshold SOC, wherein the lower threshold SOC is based on a charge sufficient to propel the vehicle the remaining distance, then the damping stiffness may not be adjusted. Thus, if the battery SOC is between the lower threshold SOC and the threshold SOC, then the damping stiffness of the engine fixing unit may be adjusted to a stiffness between a minimum and a maximum stiffness proportional to the battery SOC. By doing this, vibrations generated by driving on the road may be reduced by reducing an engine movement apart from the sprung mass. That is to say, the engine may vibrate and move more closely with the sprung mass when the engine fixing unit is stiffened.

In some examples, prior to exiting the all-electric operation, the stiffness of the fixing unit may be preemptively reduced based on a subsequent operation (e.g., hybrid operation or engine only operation) to mitigate NVH upon restart of the engine.

Returning to 204, if the engine is active, then at 210, the method 200 includes determining if a hybrid mode is active. The hybrid may include the engine and the electric motor operating in tandem. If the electric motor is not active, then at 212, the method 200 may include entering a second mode. The second mode may include adjusting the damping stiffness to a lower threshold level at 214 in response to an engine-only operation. The lower threshold level may be based on the minimum stiffness of the engine fixing unit. By doing this, vibrations generated due to engine combustion are at least partially absorbed and vibration transfer to the sprung mass and/or vehicle frame is reduced.

Returning to 210, if the electric motor is active and a hybrid mode is active, then at 216, the method 200 may include entering a third mode.

At 218, the method 200 may include adjusting the damping stiffness of the engine fixing unit to a stiffness between the upper threshold level and the lower threshold level. In one example, a level of damping stiffness selected may be inversely proportional to one or more of an engine power output, an engine speed, and an engine load. For example, as the engine power output increases, the level of damping stiffness selected may be reduced to reduce vibrations transferred to the sprung mass. As another example, as the engine power output decreases, the level of damping stiffness may increase to reduce misaligned vibrations between the sprung mass and the engine due to road conditions. When the engine power output decreases, the level of damping stiffness may be further based on current road conditions, wherein as the road conditions become more uneven or rough, the level of damping stiffness may increase. However, if the road is relatively flat, then the level of damping stiffness may decrease to reduce engine vibrations transferring to the vehicle frame. By doing this, NVH may be reduced.

The technical effect of the fixing unit is to actively control the stiffness of the fixing unit in response to conditions. The conditions may include one or more of a vehicle operating mode, a battery SOC, and road conditions. In one example, if the battery SOC is above a threshold SOC, then the fixing unit may be increased to a maximum stiffness during an all-electric mode. The stiffness of the fixing unit may be reduced outside of the all-electric mode and equal to a minimum stiffness during an engine-only mode.

The disclosure provides support for a method including adjusting a stiffness of an engine fixing unit in response to a power output of an engine. A first example of the method further includes where the adjusting comprises increasing the stiffness in response to the power output decreasing. A second example of the method, optionally including the first example, further includes where the adjusting comprises decreasing the stiffness in response to the power output increasing. A third example of the method, optionally including one or more of the previous examples, further includes in response to the power output of the engine being equal to zero due to the engine being inactive, adjusting the stiffness to an upper threshold value. A fourth example of the method, optionally including one or more of the previous examples, further includes in response to the power output being above a threshold engine power output due to an electric motor being inactive, adjusting the stiffness to a lower threshold value, wherein the lower threshold value is less than the upper threshold value. A fifth example of the method, optionally including one or more of the previous examples, further includes the engine fixing unit is coupled to a sprung mass and separate from a vehicle suspension system.

The disclosure provides further support for a hybrid vehicle including an engine coupled to a sprung mass of a vehicle via at least one engine fixing unit, an electric motor, and a controller with instructions stored on memory that cause the controller to adjust a stiffness of the at least one engine fixing unit in response to a hybrid operation, an all-electric operation, and an engine-only operation. A first example of the hybrid vehicle further includes where the instructions cause the controller to increase the stiffness of the at least one engine fixing unit during the all-electric operation to an upper threshold level. A second example of the hybrid vehicle, optionally including the first example, further includes where the instructions further cause the controller to decrease the stiffness of the at least one engine fixing unit during the engine-only operation to a lower threshold level, wherein the lower threshold level is less than the upper threshold level. A third example of the hybrid vehicle, optionally including one or more of the previous examples, further includes where the instructions further cause the controller to adjust the stiffness of the at least one engine fixing unit during the hybrid operation to a level between the upper threshold level and the lower threshold level. A fourth example of the hybrid vehicle, optionally including one or more of the previous examples, further includes where the stiffness of the at least one engine fixing unit is further based on a state-of-charge of a battery of the hybrid vehicle. A fifth example of the hybrid vehicle, optionally including one or more of the previous examples, further includes where the stiffness of the at least one engine fixing unit is further based on road conditions. A sixth example of the hybrid vehicle, optionally including one or more of the previous examples, further includes where the at least one engine fixing unit is one of a plurality of engine fixing units. A seventh example of the hybrid vehicle, optionally including one or more of the previous examples, further includes a battery, and wherein a battery state-of-charge is consumed to adjust the stiffness of the at least one engine fixing unit above a minimum stiffness. An eighth example of the hybrid vehicle, optionally including one or more of the previous examples, further includes where the stiffness of the at least one engine fixing unit is equal to the minimum stiffness during the engine-only mode.

The disclosure provides additional support for a method for a fixing unit of an engine mounted to a hybrid vehicle, the method including increasing a stiffness of the fixing unit during an all-electric mode to an upper threshold level and decreasing the stiffness of the fixing unit outside the all-electric mode. A first example of the method further includes decreasing the stiffness to a lower threshold level during an engine-only mode, wherein the lower threshold level is based on a minimum stiffness of the fixing unit and is less stiff than the upper threshold level. A second example of the method, optionally including the first example, further includes adjusting the stiffness to a stiffness between the upper threshold level and the lower threshold level during a hybrid mode. A third example of the method, optionally including one or more of the previous examples, further includes decreasing the stiffness to the lower threshold level in response to a state-of-charge of a battery being less than a threshold charge. A third example of the method, optionally including one or more of the previous examples, further includes where the stiffness of the fixing unit is further based on one or more of a state-of-charge of a battery, a remaining distance of a travel path, and road conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   adjusting a stiffness of an engine fixing unit in response to a power output of an engine; and
   in response to the power output of the engine being equal to zero due to the engine being inactive, adjusting the stiffness to an upper threshold value.

2. The method of claim 1, wherein the adjusting comprises increasing the stiffness in response to the power output decreasing.

3. The method of claim 1, wherein the adjusting comprises decreasing the stiffness in response to the power output increasing.

4. The method of claim 1, further comprising in response to the power output being above a threshold engine power output due to an electric motor being inactive, adjusting the stiffness to a lower threshold value, wherein the lower threshold value is less than the upper threshold value.

5. The method of claim 1, wherein the engine fixing unit is coupled to a sprung mass and separate from a vehicle suspension system.

6. A hybrid vehicle, comprising:
   an engine coupled to a sprung mass of a vehicle via at least one engine fixing unit;
   an electric motor; and
   a controller with instructions stored on memory that cause the controller to:
   adjust a stiffness of the at least one engine fixing unit in response to a hybrid operation, an all-electric operation, and an engine-only operation.

7. The hybrid vehicle of claim 6, wherein the instructions cause the controller to increase the stiffness of the at least one engine fixing unit during the all-electric operation to an upper threshold level.

8. The hybrid vehicle of claim 7, wherein the instructions further cause the controller to decrease the stiffness of the at least one engine fixing unit during the engine-only operation to a lower threshold level, wherein the lower threshold level is less than the upper threshold level.

9. The hybrid vehicle of claim 8, wherein the instructions further cause the controller to adjust the stiffness of the at least one engine fixing unit during the hybrid operation to a level between the upper threshold level and the lower threshold level.

10. The hybrid vehicle of claim 6, wherein the stiffness of the at least one engine fixing unit is further based on a state-of-charge of a battery of the hybrid vehicle.

11. The hybrid vehicle of claim 6, wherein the stiffness of the at least one engine fixing unit is further based on road conditions.

12. The hybrid vehicle of claim 6, wherein the at least one engine fixing unit is one of a plurality of engine fixing units.

13. The hybrid vehicle of claim 6, further comprising a battery, and wherein a battery state-of-charge is consumed to adjust the stiffness of the at least one engine fixing unit above a minimum stiffness.

14. The hybrid vehicle of claim 13, wherein the stiffness of the at least one engine fixing unit is equal to the minimum stiffness during the engine-only mode.

15. A method for a fixing unit of an engine mounted to a hybrid vehicle, the method, comprising:
   increasing a stiffness of the fixing unit during an all-electric mode to an upper threshold level; and
   decreasing the stiffness of the fixing unit outside the all-electric mode.

16. The method of claim 15, further comprising decreasing the stiffness to a lower threshold level during an engine-only mode, wherein the lower threshold level is based on a minimum stiffness of the fixing unit and is less stiff than the upper threshold level.

17. The method of claim 16, further comprising adjusting the stiffness to a stiffness between the upper threshold level and the lower threshold level during a hybrid mode.

18. The method of claim 16, further comprising decreasing the stiffness to the lower threshold level in response to a state-of-charge of a battery being less than a threshold charge.

19. The method of claim 15, wherein the stiffness of the fixing unit is further based on one or more of a state-of-charge of a battery, a remaining distance of a travel path, and road conditions.

\* \* \* \* \*